(12) United States Patent
Park et al.

(10) Patent No.: US 12,135,169 B2
(45) Date of Patent: Nov. 5, 2024

(54) MULTI-STAGE VARIABLE TYPE WASTE HEAT STORAGE AND RECOVERY APPARATUS AND METHOD THEREOF

(71) Applicant: EMSOLUTION Co., Ltd, Suwon-si (KR)

(72) Inventors: Hoon Min Park, Yongin-si (KR); Dal Hwan Yoon, Jecheon-si (KR); Dong Hwan Jeon, Yongin-si (KR); Heung Ki Min, Seongnam-si (KR)

(73) Assignee: EMSOLUTION Co., Ltd, Suwon-si (KR)

( * ) Notice: Subject to any disclaimer, the term of this patent is extended or adjusted under 35 U.S.C. 154(b) by 92 days.

(21) Appl. No.: 17/901,251

(22) Filed: Sep. 1, 2022

(65) Prior Publication Data

US 2023/0228500 A1 Jul. 20, 2023

(30) Foreign Application Priority Data

Jan. 14, 2022 (KR) ........................ 10-2022-0005814

(51) Int. Cl.
*F28D 20/02* (2006.01)
(52) U.S. Cl.
CPC .................... *F28D 20/02* (2013.01)
(58) Field of Classification Search
CPC ....... F28D 20/02; F28D 20/026; F28D 20/025
USPC .......................................... 165/10
See application file for complete search history.

(56) References Cited

U.S. PATENT DOCUMENTS

| 11,703,285 | B1* | 7/2023 | Skop | F28F 17/005 |
| | | | | 165/10 |
| 2017/0307302 | A1* | 10/2017 | Jacobs | F28D 20/021 |
| 2023/0130589 | A1* | 4/2023 | Sawafta | F28F 27/02 |
| | | | | 165/10 |
| 2023/0228500 | A1* | 7/2023 | Yoon | F28D 20/02 |
| | | | | 165/10 |

FOREIGN PATENT DOCUMENTS

| JP | 2020125857 A | 8/2020 |
| KR | 20140065289 A | 5/2014 |
| KR | 20180051860 A | 2/2018 |

* cited by examiner

*Primary Examiner* — Raheena R Malik
(74) *Attorney, Agent, or Firm* — Boyle Fredrickson, S.C.

(57) ABSTRACT

A multi-stage variable type waste heat storage and recovery apparatus and method thereof are disclosed. The apparatus includes a phase change material storage unit for separating and arranging a plurality of phase change materials having different melting points, and arranging them in stages on a path of the waste heat so that a phase change material having a higher melting point is located closer to an inlet side of the waste heat; a use place registration unit; a temperature range storage unit; a phase change material selection unit for selecting a phase change material of a corresponding melting point; and a heat energy supply unit for supplying heat energy by the latent heat of the phase change material selected by the phase change material selection unit to a corresponding heat energy use place among a plurality of heat energy use places.

8 Claims, 5 Drawing Sheets

MULTI-STAGE VARIABLE TYPE WASTE HEAT STORAGE AND RECOVERY APPARATUS AND METHOD THEREOF

CROSS REFERENCE TO RELATED APPLICATIONS

This application claims benefit of priority of Korean Patent Application No. KR 10-2022-0005814, filed on Jan. 14, 2022, the contents of which are hereby incorporated by reference.

TECHNICAL FIELD

The present invention relates to an apparatus and method for storing and recovering waste heat, and more particularly, relates to a multi-stage variable type waste heat storage and recovery apparatus and method thereof capable of preventing waste of heat energy and equipment loss at a place where heat energy is used by variably selecting a phase change material and supplying heat energy depending on the temperature required by the place where the heat energy is used.

BACKGROUND ART

Waste heat is energy that is wasted without being used in heat generation and use facilities, and there are various types and forms in various industrial processes. In particular, since the steel industry has many processes that require high temperatures, a large amount of energy must be used, and thus, a lot of waste heat is also generated.

The waste heat recovery device is a device that recovers waste heat that is wasted in such a way and reuses it, and it can be said that it is essential for energy saving.

As one of waste heat recovery and storage methods, there is a method using a phase change material (PCM). The phase change material as such a heat energy storage medium can be a number of organic/inorganic materials with a low melting point of about 0 to 120° C. and a high latent heat. In addition, this phase change material should be of low odor, low toxicity, and reusable material. In addition, in order to be used as a heat energy storage material, it must have appropriate thermodynamic and chemical properties, and high latent heat and energy density during phase transition, and low price are required.

Meanwhile, the temperature of the waste heat required for the place of use of heat energy may vary depending on the purpose of using the heat energy, the specifications of the sensor applied to the place of use of the heat energy, the surrounding environment of the place of use of the heat energy, and the like.

However, since the general waste heat recovery device uniformly supplies waste heat without considering the temperature required by a heat energy use place, there is a problem in that it may cause waste of heat energy or damage the equipment at a heat energy use place.

PRIOR ART LITERATURE

Patent Literature

Korean Patent Laid-Open Publication No. 10-2014-0065289 (published date: May 29, 2014)

DETAILED DESCRIPTION OF THE INVENTION

Technical Subject

The present invention has been devised to solve the above problems and aims to provide a multi-stage variable type waste heat storage and recovery apparatus and method thereof capable of preventing the waste of heat energy and equipment loss at a heat energy use place by supplying heat energy through selection of a phase change material variably according to the temperature required by the heat energy use place.

Technical Solution

A multi-stage variable type waste heat storage and recovery apparatus according to an aspect of the present invention for achieving the previously described object is characterized by comprising: a phase change material storage unit for separating and arranging a plurality of phase change materials having different melting points, and arranging them in stages on a path of the waste heat so that a phase change material having a higher melting point is located closer to an inlet side of the waste heat; a use place registration unit for registering a plurality of heat energy use places; a temperature range storage unit for storing a required temperature range of each of the heat energy use places registered in the use place registration unit; a phase change material selection unit for selecting a phase change material of a corresponding melting point among a plurality of phase change materials stored in the phase change material storage unit according to the temperature range of each of the heat energy use places stored in the temperature range storage unit; and a heat energy supply unit for supplying heat energy due to the latent heat of the phase change material selected by the phase change material selection unit to a corresponding heat energy use place among a plurality of heat energy use places.

The previously described multi-stage variable type waste heat storage and recovery apparatus may further include: a usage time storage unit for storing a required usage time of each of the heat energy use places; a temperature range grouping unit for grouping heat energy use places whose required temperature range among a plurality of heat energy use places is included in a preset temperature range; and a supply control unit for controlling the heat energy supply unit to sequentially supply heat energy according to the usage time stored in the usage time storage unit for the heat energy use place grouped into the same group by the temperature range grouping unit.

The previously described multi-stage variable type waste heat storage and recovery apparatus may further include: a usage time storage unit for storing a required usage time of each of heat energy use places; a usage time grouping unit for grouping heat energy use places including the same usage time among a plurality of heat energy use places; and a phase change material matching unit for matching a phase change material corresponding to a temperature range of each of the heat energy use places among a plurality of the phase change materials for the heat energy use places grouped into groups of the same usage time by the usage time grouping unit.

The previously described multi-stage variable type waste heat storage and recovery apparatus may further include: a calorie calculation unit for calculating a required calorie for each matched heat energy use place when two or more heat energy use places are matched in response to any phase change material by the phase change material matching unit; a calorie comparison unit for comparing the total calorie calculated by the calorie calculation unit with a latent calorie of the corresponding phase change material; and an additional selection unit for additionally selecting a phase change material at a lower level than the corresponding phase change material when it is determined that the total calorie is greater than the latent calorie by the calorie comparison unit. In this case, the heat energy supply unit supplies heat energy by a latent heat of the phase change material being selected by the additional selection unit together.

A method for multi-stage variable type waste heat storage and recovery according to an aspect of the present invention for achieving the previously described purpose is characterized by comprising the steps of:

arranging a plurality of phase change materials having different melting points, but arranging them in stages on a path of the waste heat so that a phase change material having a higher melting point is located closer to an inlet side of the waste heat; registering a plurality of heat energy use places; storing a required temperature range of each registered heat energy use place; selecting a phase change material having a corresponding melting point among the plurality of phase change materials according to the temperature range of each of the heat energy use places; and supplying heat energy by a latent heat of the selected phase change material to a corresponding heat energy use place among a plurality of heat energy use places.

The previously described method for multi-stage variable type waste heat storage and recovery may further include the steps of: storing a required usage time of each of the heat energy use places; grouping heat energy use places in which a required temperature range among a plurality of the heat energy use places is included in a preset set temperature range; and controlling the supply of heat energy so as to be sequentially accomplished according to the stored usage time to the heat energy use place grouped into the same group.

The previously described method for multi-stage variable type waste heat storage and recovery may further include the steps of: storing a required usage time of each of the heat energy use places; grouping heat energy use places including the same usage time among the plurality of heat energy use places; and matching a phase change material corresponding to a temperature range of each of the heat energy use places among a plurality of the phase change materials for the heat energy use place grouped into the group of the same usage time.

The previously described method for multi-stage variable type waste heat storage and recovery may further include the steps of: calculating a required calorie of each matched heat energy use place when two or more heat energy use places are matched in response to any phase change material; comparing the calculated total calorie with a calorie of a corresponding phase change material; additionally selecting a phase change material that is lower than the corresponding phase change material when it is determined that the total calorie is greater than the latent calorie; and supplying together with heat energy by a latent heat of the phase change material that is additionally selected.

Advantageous Effects

According to the present invention, it is possible to prevent the waste of heat energy and equipment loss of the heat energy use place by supplying heat energy through selection of a phase change material variably according to the temperature required by the heat energy use place.

BEST MODE

Figure 1:
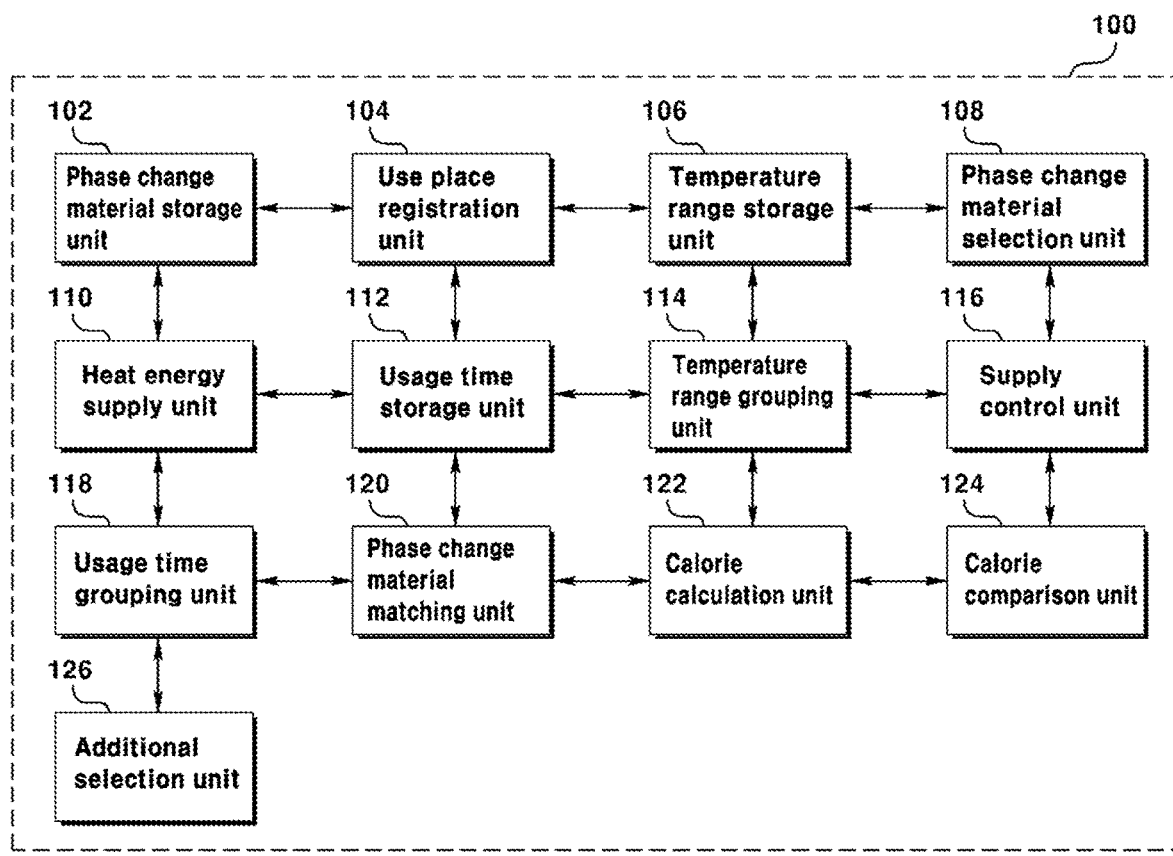
FIG. 1 is a diagram schematically illustrating the configuration of a multi-stage variable type waste heat storage and recovery apparatus according to an embodiment of the present invention.

Hereinafter, some embodiments of the present invention will be described with reference to exemplary drawings. In describing the reference numerals for the components of each drawing, the same components are denoted by the same reference numerals as much as possible even though they are displayed on different drawings. In addition, in describing the embodiment of the present invention, if it is determined that a detailed description of a related known configuration or function interferes with the understanding of the embodiment of the present invention, the detailed description thereof will be omitted.

In addition, in describing the components of the embodiment of the present invention, terms such as first, second, A, B, (a), and (b) may be used. These terms are merely intended to distinguish the components from other components, and the terms do not limit the nature, order or sequence of the components. When a component is described as being "connected", "coupled" or "interconnected" to another component, the component may be directly connected, coupled, or interconnected to the other component, but it should be understood that another component may be "connected", "coupled" or "interconnected" between the component and the other component.

FIG. 1 is a diagram schematically illustrating the configuration of a multi-stage variable type waste heat storage and recovery apparatus according to an embodiment of the present invention.

Referring to FIG. 1, a multi-stage variable type waste heat storage and recovery apparatus 100 according to an embodiment of the present invention may comprise: a phase change material storage unit 102; a use place registration unit 104; a temperature range storage unit 106; a phase change material selection unit 108; a heat energy supply unit 110; an usage time storage unit 112; a temperature range grouping unit 114; a supply control unit 116; an usage time grouping unit 118; a phase change material matching unit 120; a calorie calculation unit 122; a calorie comparison unit 124; and an additional selection unit 126.

The phase change material storage unit 102 separates and arranges a plurality of phase change materials having different melting points from one another, but arranges them in stages on the path of the waste heat so that the phase change material having a higher melting point is positioned closer to the inlet side of the waste heat. At this time, the phase change material storage unit 102 is preferably stored by matching the type of each phase change material and the melting point corresponding thereto.

A phenomenon in which a material changes from one phase to another phase according to certain external conditions such as temperature, pressure, external magnetic field, and the like is referred to as a phase change, and a material capable of such a phase change is referred to as a phase change material. Examples of phase change materials include water, paraffin wax, and the like.

Figure 2:
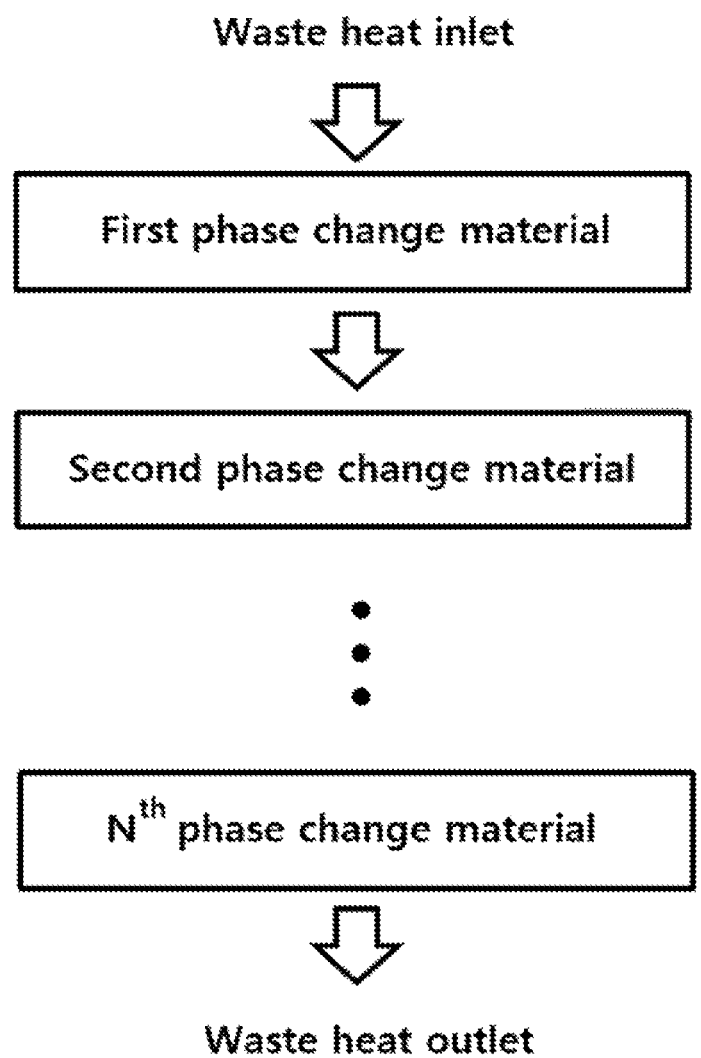
FIG. 2 is a diagram illustrating an arrangement of a phase change material.

The phase change material storage unit 102 separately stores various phase change materials having different melting points. At this time, the phase change material storage unit 102 may sequentially arrange each phase change material on a path from an inlet of waste heat to an outlet, as illustrated in FIG. 2.

The temperature of waste heat may gradually decrease in the process of being discharged from the inlet to the outlet. In this case, since the temperature of the inlet of the waste heat is higher than the temperature of the outlet of the waste heat, the phase change material storage unit 102 arranges in a way that each phase change material having a higher melting point is positioned closer to the inlet side of the waste heat, thereby allowing each phase change material to store the energy of waste heat in stages according to the corresponding melting point.

The use place registration unit 104 registers a plurality of heat energy use places. That is, the use place registration unit 104 registers the heat energy use place to be used by recovering the heat energy of waste heat. At this time, the use place registration unit 104 may register a plurality of heat energy use places. Here, the heat energy use place may be a specific device such as a heater or an air conditioner as well as a specific place such as a kitchen or living room.

The temperature range storage unit 106 stores the required temperature range of each heat energy use place registered in the use place registration unit 104. At this time, the temperature range storage unit 106 may store different temperature ranges in response to the type and location of the heat energy use place. In this case, the temperature range storage unit 106 may store different temperature ranges depending on the location even in the same type of heat energy use place. For example, the temperature range storage unit 106 may store in a way that that the temperature range required corresponding to the heater located at position A is 20~25° C., and the temperature range required corresponding to the heater located at position B is 23~28° C.

Figure 3:
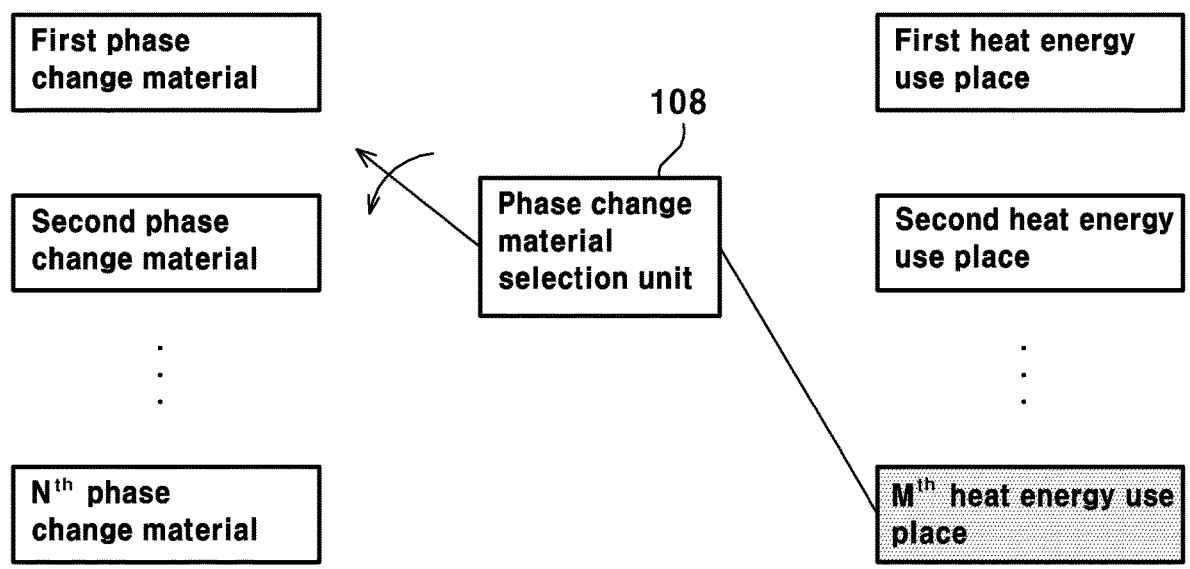
FIG. 3 is a diagram illustrating an example of selecting a phase change material corresponding to a temperature range of a heat energy use place.

The phase change material selection unit 108 selects a phase change material having a corresponding melting point among a plurality of phase change materials stored in the phase change material storage unit 102 according to the temperature range of each heat energy use place stored in the temperature range storage unit 106. At this time, the phase change material selection unit 108 determines the required temperature range of a specific heat energy use place among a plurality of heat energy use places, as illustrated in FIG. 3, and may automatically select a phase change material corresponding to the determined temperature range.

The heat energy supply unit 110 supplies the heat energy by the latent heat of the phase change material selected by the phase change material selection unit 108 to a corresponding heat energy use place among a plurality of heat energy use places. That is, the heat energy supply unit 110 supplies heat energy by the latent heat of waste heat from the phase change material corresponding to the required temperature range of a specific heat energy use place to the corresponding specific heat energy use place.

The usage time storage unit 112 stores the required usage time of each heat energy use place registered in the use place registration unit 104. That is, each heat energy use place registered in the use place registration unit 104 may have a different time period for using heat energy, and in this case, the usage time storage unit 112 may store the time period in which each heat energy use place is using heat energy.

The temperature range grouping unit 114 groups the heat energy use places in which the required temperature range is included in a preset temperature range among a plurality of heat energy use places. At this time, the temperature range grouping unit 114 sets the temperature range in response to the melting point of each phase change material, and may group the heat energy use places in which the required temperature range of each heat energy use place is included within the preset temperature range. In this case, it is preferred that the phase change material storage unit 102 arranges the phase change materials, in which each set temperature range being set by the temperature range grouping unit 114 does not overlap with each other, in stages.

The supply control unit 116 controls the heat energy supply unit 110 in a way that the heat energy is sequentially supplied for the heat energy use place grouped into the same group by the temperature range grouping unit 114 according to the usage time stored in the usage time storage unit 112. For example, when the temperature range is set to 20~40° C., a heat energy use place A with usage time from 00:00 AM to 00:30 AM, a heat energy use place B with usage time from 00:30 am to 01:00 am, and a heat energy use place C with usage time from 01:00 am to 01:30 am may be included within the set temperature range. In this case, the supply control unit 116 may control the heat energy supply unit 110 in a way that the heat energy is supplied sequentially from the heat energy use place A to the heat energy use place B and then to the heat energy use place C according to the heat energy usage time of each heat energy use place.

Meanwhile, two or more heat energy use places having the same usage time may be included within the set temperature range. In this case, the supply control unit 116 calculates the total amount of calories required by the heat energy use place having the same usage time, and it is desirable to control so that that the phase change material below the melting point of the corresponding phase change material supplies heat energy together when the total amount of calories being calculated is greater than the calories of the phase change material.

The usage time grouping unit 118 groups the heat energy use places including the same usage time among a plurality of heat energy use places. At this time, even if two or more heat energy use places have the same usage time, the required temperature range of each heat energy use place may be different.

The phase change material matching unit 120 matches a phase change material corresponding to the temperature range of each heat energy use place among the plurality of phase change materials for the heat energy use place grouped into groups of the same usage time by the usage time grouping unit 118. That is, the phase change material matching unit 120 matches a phase change material corresponding to the temperature range of each heat energy use place including the same usage time.

The calorie calculation unit 122 calculates the required calories for each matched heat energy use place when two or more heat energy use places are matched in response to any phase change material by the phase change material matching unit 120. That is, when any phase change material needs to supply heat energy to two or more heat energy use places at the same time, the calorie calculation unit 122 calculates the calorie of each heat energy use place that needs to be supplied with heat energy from the corresponding phase change material at the same time.

The calorie comparison unit 124 compares the total of calories being calculated by the calorie calculation unit 122 with the latent calorie of the corresponding phase change material. That is, the calorie comparison unit 124 compares the sum of the calories of each heat energy use place with the latent calorie of a corresponding arbitrary phase change material when two or more heat energy use places need to be supplied with calories from an arbitrary phase change material at the same time.

The additional selection unit 126 additionally selects a phase change material that is lower than the corresponding phase change material when determined that the total of calories by the calorie comparison unit 124 is greater than the latent calorie of the corresponding phase change material. That is, the additional selection unit 126 additionally selects a phase change material having a melting point lower than the melting point of the corresponding phase change material when determined that the total of calories by the calorie comparison unit 124 is greater than the latent calorie of the corresponding phase change material.

In this case, the heat energy supply unit 110 supplies the heat energy by the latent heat of the phase change material being selected by the additional selection unit 126 to each heat energy use place together with the heat energy being supplied by the existing corresponding phase change material.

Thereby, each heat energy use place is stably supplied with heat energy from the phase change material below the required temperature range, and waste heat can be recovered in an optimal environment.

Figure 4:
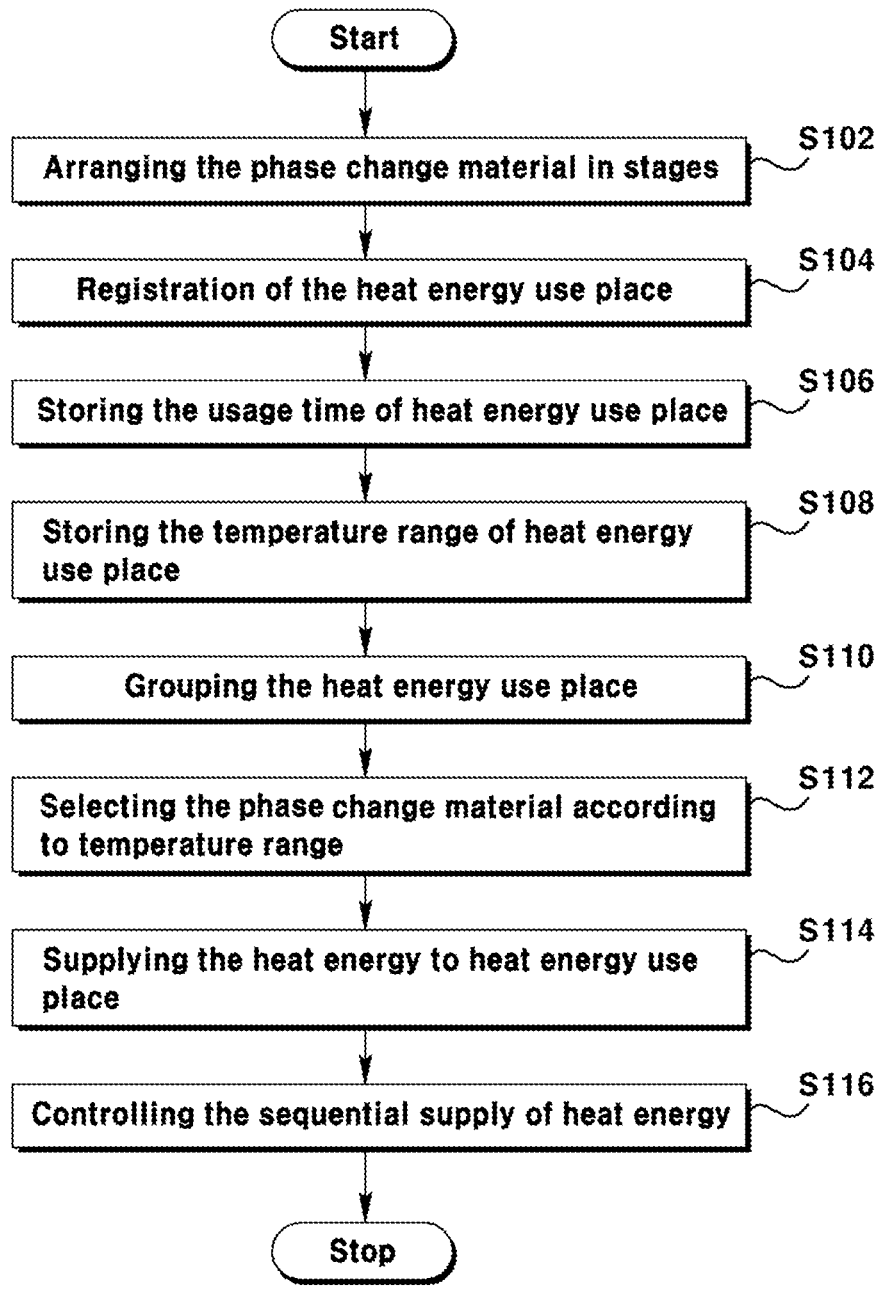
FIG. 4 is a diagram showing a method for multi-stage variable type waste heat storage and recovery according to an embodiment of the present invention.

FIG. 4 is a diagram showing a method for multi-stage variable type waste heat storage and recovery according to an embodiment of the present invention. The method for multi-stage variable type waste heat storage and recovery according to an embodiment of the present invention can be performed by the multi-stage variable type waste heat storage and recovery apparatus (hereinafter referred to as 'waste heat recovery apparatus') 100 shown in FIG. 1.

The waste heat recovery apparatus 100 separates and arranges a plurality of phase change materials having different melting points, respectively, but they are arranged in stages on the path of the waste heat in a way that the phase change material having a higher melting point is positioned closer to the inlet side of the waste heat (S102). At this time, it is preferred that the waste heat recovery apparatus 100 stores through matching the type of each phase change material with the corresponding melting point.

A phenomenon in which a material changes from one phase to another phase according to certain external conditions such as temperature, pressure, external magnetic field, and the like is referred to as a phase change, and a material capable of such a phase change is referred to as a phase change material. Examples of phase change materials include water, paraffin wax, and the like.

The waste heat recovery apparatus 100 separately stores various phase change materials having different melting points. At this time, the waste heat recovery apparatus 100 may sequentially arrange each phase change material on a path from an inlet of waste heat to an outlet.

The temperature of waste heat may gradually decrease in the process of being discharged from the inlet to the outlet. In this case, since the temperature of the inlet of the waste heat is higher than the temperature of the outlet of the waste heat, the waste heat recovery apparatus 100 arranges in a way that each phase change material having a higher melting point is positioned closer to the inlet side of the waste heat, thereby allowing each phase change material to store the energy of waste heat in stages according to the corresponding melting point.

The waste heat recovery apparatus 100 is registered with a plurality of heat energy use places (S104). That is, the waste heat recovery apparatus 100 registers the heat energy use place to be used by recovering the heat energy of waste heat. At this time, the waste heat recovery apparatus 100 may register a plurality of heat energy use places. Here, the heat energy use place may be a specific device such as a heater or an air conditioner as well as a specific place such as a kitchen or living room.

The waste heat recovery apparatus 100 stores the required usage time of each heat energy use place registered (S106). Here, each heat energy use place may have a different time period for using heat energy, and in this case, the waste heat recovery apparatus 100 may store by matching the time period in which each heat energy use place is using heat energy.

The waste heat recovery apparatus 100 stores the required temperature range of each heat energy use place registered. At this time, the waste heat recovery apparatus 100 may store different temperature ranges in response to the type and location of the heat energy use place. In this case, the waste heat recovery apparatus 100 may store different temperature ranges depending on the location even in the same type of heat energy use place. For example, the waste heat recovery apparatus 100 may store in a way that that the temperature range required corresponding to the heater located at position A is 20~25° C., and the temperature range required corresponding to the heater located at position B is 23~28° C.

The waste heat recovery apparatus 100 groups the heat energy use places in which the required temperature range is included in a preset temperature range among a plurality of heat energy use places (S110). At this time, the waste heat recovery apparatus 100 sets the temperature range in response to the melting point of each phase change material, and may group the heat energy use places in which the required temperature range of each heat energy use place is included within the preset temperature range. In this case, it is preferable that the waste heat recovery apparatus 100 arranges phase change materials, in which each set temperature range does not overlap with each other, in stages.

The waste heat recovery apparatus 100 selects a phase change material having a corresponding melting point among a plurality of phase change materials according to the temperature range of each heat energy use place (S112). At this time, the waste heat recovery apparatus 100 determines a required temperature range of a specific heat energy use place among a plurality of heat energy use places, and may automatically select a phase change material corresponding to the determined temperature range.

The waste heat recovery apparatus 100 supplies heat energy by a latent heat of the selected phase change material to a corresponding heat energy use place among a plurality of heat energy use places (S114). That is, waste heat recovery apparatus 100 supplies heat energy by the latent heat of waste heat from the phase change material corresponding to the required temperature range of a specific heat energy use place to the corresponding specific heat energy use place.

The waste heat recovery apparatus 100 controls to sequentially supply heat energy to the heat energy use places grouped into the same group according to the usage time stored in response to each heat energy use place (S116). For example, when the temperature range is set to 20~40° C., a heat energy use place A with usage time from 00:00 AM to 00:30 AM, a heat energy use place B with usage time from 00:30 am to 01:00 am, and a heat energy use place C with usage time from 01:00 am to 01:30 am may be included within the set temperature range. In this case, the waste heat recovery apparatus 100 may control the heat energy supply unit 110 in a way that the heat energy is supplied sequentially from the heat energy use place A to the heat energy use place B and then to the heat energy use place C according to the heat energy usage time of each heat energy use place.

Meanwhile, two or more heat energy use places having the same usage time may be included within the set temperature range. In this case, the waste heat recovery apparatus 100 calculates the total amount of calories required by the heat energy use place having the same usage time, and it is desirable to control so that that the phase change material below the melting point of the corresponding phase change material supplies heat energy together when the total amount of calories being calculated is greater than the calories of the phase change material.

Figure 5:
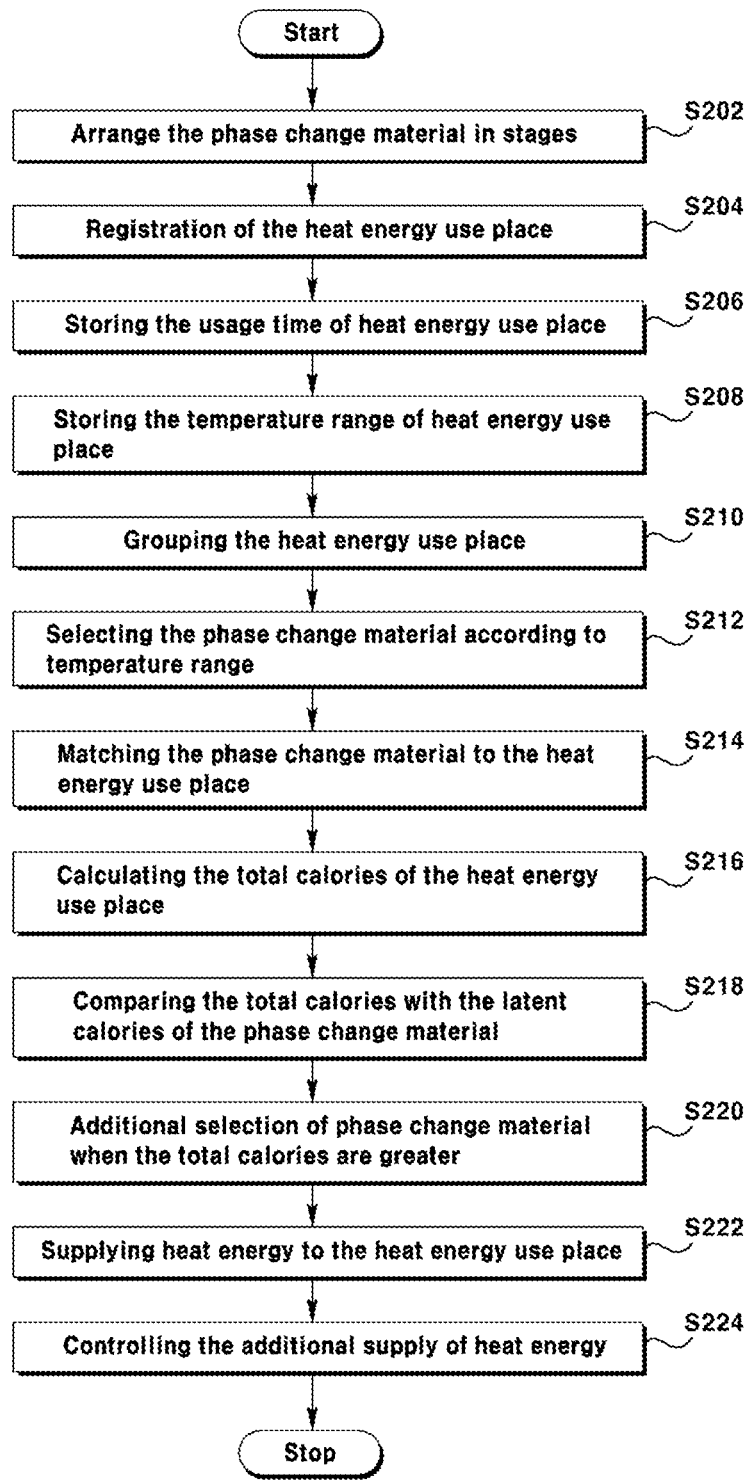
FIG. 5 is a diagram showing a method for multi-stage variable type waste heat storage and recovery according to another embodiment of the present invention.

FIG. 5 is a diagram showing a method for multi-stage variable type waste heat storage and recovery according to another embodiment of the present invention. A method for multi-stage variable type waste heat storage and recovery according to another embodiment of the present invention can be performed by a multi-stage variable type waste heat storage and recovery apparatus (hereinafter referred to as 'waste heat recovery apparatus') 100 shown in FIG. 1.

The waste heat recovery apparatus 100 separates and arranges a plurality of phase change materials having different melting points, respectively, but they are arranged in stages on the path of the waste heat in a way that the phase change material having a higher melting point is positioned closer to the inlet side of the waste heat (S202). At this time, it is preferred that the waste heat recovery apparatus 100 stores through matching the type of each phase change material with the corresponding melting point.

A phenomenon in which a material changes from one phase to another phase according to certain external conditions such as temperature, pressure, external magnetic field, and the like is referred to as a phase change, and a material capable of such a phase change is referred to as a phase change material. Examples of phase change materials include water, paraffin wax, and the like.

The waste heat recovery apparatus 100 separately stores various phase change materials having different melting points. At this time, the waste heat recovery apparatus 100 may sequentially arrange each phase change material on a path from an inlet of waste heat to an outlet.

The temperature of waste heat may gradually decrease in the process of being discharged from the inlet to the outlet. In this case, since the temperature of the inlet of the waste heat is higher than the temperature of the outlet of the waste heat, the waste heat recovery apparatus 100 arranges in a way that each phase change material having a higher melting point is positioned closer to the inlet side of the waste heat, thereby allowing each phase change material to store the energy of waste heat in stages according to the corresponding melting point.

The waste heat recovery apparatus 100 registers a plurality of heat energy use places. That is, the waste heat recovery apparatus 100 registers the heat energy use place to be used by recovering the heat energy of waste heat. At this time, the waste heat recovery apparatus 100 may register a plurality of heat energy use places. Here, the heat energy use place may be a specific device such as a heater or an air conditioner as well as a specific place such as a kitchen or living room.

The waste heat recovery apparatus 100 stores the required usage time of each registered heat energy use place (S206). Here, each heat energy use place may have a different time period in which heat energy is used, and in this case, the waste heat recovery apparatus 100 may store by matching the time period wherein each heat energy use place uses heat energy.

The waste heat recovery apparatus 100 stores the required temperature range of each registered heat energy use place (S208). At this time, the waste heat recovery apparatus 100 may store different temperature ranges in response to the type and location of the heat energy use place. In this case, the waste heat recovery apparatus 100 may store different temperature ranges depending on the location even in the same type of heat energy use place. For example, the waste heat recovery apparatus 100 may store in a way that that the temperature range required corresponding to the heater located at position A is 20~25° C., and the temperature range required corresponding to the heater located at position B is 23~28° C.

The waste heat recovery apparatus 100 groups the heat energy use places including the same usage time among a plurality of heat energy use places (S210). At this time, even if two or more heat energy use places have the same usage time, the required temperature range of each heat energy use place may be different.

The waste heat recovery apparatus 100 selects a phase change material having a corresponding melting point among a plurality of phase change materials according to the temperature range of each heat energy use place (S212). At this time, the waste heat recovery apparatus 100 determines a required temperature range of a specific heat energy use place among a plurality of heat energy use places, and may automatically select a phase change material corresponding to the determined temperature range.

The waste heat recovery apparatus 100 matches the phase change material corresponding to the temperature range of each heat energy use place among the plurality of phase change materials for the heat energy use places grouped into groups of the same usage time (S214). That is, the waste heat recovery apparatus 100 matches a phase change material corresponding to the temperature range of each heat energy use place including the same usage time.

The waste heat recovery apparatus 100 calculates the required calories for each matched heat energy use place when two or more heat energy use places are matched in response to any phase change material (S216). That is, when any phase change material needs to supply heat energy to two or more heat energy use places at the same time, the waste heat recovery apparatus 100 calculates the calorie of each heat energy use place that needs to be supplied with heat energy from the corresponding phase change material at the same time.

The waste heat recovery apparatus 100 compares the total of calories being calculated with the latent calorie of the corresponding phase change material (S218). That is, the waste heat recovery apparatus 100 compares the sum of the calories of each heat energy use place with the latent calorie of corresponding arbitrary phase change material when two or more heat energy use places need to be supplied with calories from an arbitrary phase change material at the same time.

The waste heat recovery apparatus 100 additionally selects a phase change material that is lower than the corresponding phase change material when determined that the total of calories is greater than the latent calorie of the corresponding phase change material (S220). That is, the waste heat recovery apparatus 100 additionally selects a phase change material having a melting point lower than the melting point of the corresponding phase change material when determined that the total of calories by the waste heat recovery apparatus 100 is greater than the latent calorie of the corresponding phase change material.

The waste heat recovery apparatus 100 supplies heat energy by a latent heat of the selected phase change material to a corresponding heat energy use place among a plurality of heat energy use places (S222). That is, waste heat recovery apparatus 100 supplies heat energy by the latent heat of waste heat from the phase change material corresponding to the required temperature range of a specific heat energy use place to the corresponding specific heat energy use place.

At this time, when the sum of calories of each heat energy use place corresponding to an arbitrary phase change material is greater than the latent calorie of the corresponding phase change material, the waste heat recovery apparatus 100 controls in a way that the heat energy by latent heat of the additionally selected phase change material is supplied to each heat energy use place together with the heat energy supplied by an existing corresponding arbitrary phase change material (S224).

At this time, it is preferred that the waste heat recovery apparatus 100 supplies heat energy to each heat energy use place from a phase change material corresponding to a melting point one step lower than the corresponding arbitrary phase change material.

Although the embodiments according to the present invention have been described above, these are merely exemplary, and those of ordinary skill in the art will understand that various modifications and equivalent ranges of embodiments are possible therefrom. Accordingly, the protection scope of the present invention should be defined by the following claims as well as their equivalents.

We claim:

1. A waste heat storage and recovery apparatus comprising:
   a phase change material storage unit for separating and arranging a plurality of phase change materials having different melting points, and arranging them in stages on a path of the waste heat so that a phase change material having a higher melting point is located closer to an inlet side of the waste heat;
   a use place registration unit for registering a plurality of heat energy use places;
   a temperature range storage unit for storing a required temperature range of each of the heat energy use places registered in the use place registration unit;
   a phase change material selection unit for selecting a phase change material of a corresponding melting point among a plurality of phase change materials stored in the phase change material storage unit according to the temperature range of each of the heat energy use places stored in the temperature range storage unit; and
   a heat energy supply unit for supplying heat energy by a latent heat of the phase change material selected by the phase change material selection unit to a corresponding heat energy use place among a plurality of heat energy use places, and
   wherein the use place registration unit registers at least one of a heater and an air conditioner corresponding to a place,
   wherein the temperature range storage unit stores temperature range required by the heater or the air conditioner, and
   wherein the heat energy supply unit supplies heat energy by the latent heat of the selected phase change material to a corresponding to the heater or the air conditioner.

2. The waste heat storage and recovery apparatus of claim 1, further comprising:
   a usage time storage unit for storing a required usage time of each of heat energy use places;
   a temperature range grouping unit for grouping heat energy use places whose required temperature range among a plurality of heat energy use places is included in a preset temperature range; and
   a supply control unit for controlling the heat energy supply unit to sequentially supply heat energy according to the usage time stored in the usage time storage unit for the heat energy use place grouped into the same group by the temperature range grouping unit.

3. The waste heat storage and recovery apparatus of claim 1, further comprising:
   a usage time storage unit for storing a required usage time of each of heat energy use places;
   a usage time grouping unit for grouping heat energy use places including the same usage time among a plurality of the heat energy use places; and
   a phase change material matching unit for matching a phase change material corresponding to a temperature range of each of the heat energy use places among a plurality of the phase change materials for the heat energy use places grouped into groups of the same usage time by the usage time grouping unit.

4. The waste heat storage and recovery apparatus of claim 3, further including:
   a calorie calculation unit for calculating a required calorie for each matched heat energy use place when two or more heat energy use places are matched in response to any phase change material by the phase change material matching unit;
   a calorie comparison unit for comparing the total calorie calculated by the calorie calculation unit with a latent calorie of the corresponding phase change material; and
   an additional selection unit for additionally selecting a phase change material at a lower level than the corresponding phase change material when it is determined that the total calorie is greater than the latent calorie by the calorie comparison unit,
   wherein the heat energy supply unit supplies heat energy by a latent heat of the phase change material being selected by the additional selection unit together.

5. A method for waste heat storage and recovery comprising the steps of:
   arranging a plurality of phase change materials having different melting points, but arranging them in stages on a path of a waste heat so that a phase change material having a higher melting point is located closer to an inlet side of the waste heat;
   registering a plurality of heat energy use places;
   storing a required temperature range of each registered heat energy use place;
   selecting a phase change material having a corresponding melting point among the plurality of phase change materials according to the temperature range of each of the heat energy use places; and supplying heat energy by a latent heat of the selected phase change material to a corresponding heat energy use place among a plurality of heat energy use places, and wherein the step of registering a plurality of heat energy use places registers at least one of a heater and an air conditioner corresponding to a place, wherein the step of storing a required temperature range of each registered heat energy use place stores temperature range required by the heater or the air conditioner, and wherein the step of supplying heat energy by a latent heat of the selected phase change material to a corresponding heat energy use place among a plurality of heat energy use places supplies heat energy by the latent heat of the selected phase change material to a corresponding to the heater or the air conditioner.

6. The method for waste heat storage and recovery of claim 5, further comprising the steps of:

storing a required usage time of each of the heat energy use places; grouping heat energy use places in which a required temperature range among a plurality of the heat energy use places is included in a preset set temperature range; and controlling the supply of heat energy so as to be sequentially accomplished according to the stored usage time to the heat energy use place grouped into the same group.

7. The method for waste heat storage and recovery of claim 5, further including the steps of:

storing a required usage time of each of the heat energy use places; grouping heat energy use places including the same usage time among a plurality of the heat energy use places; and matching a phase change material corresponding to a temperature range of each of the heat energy use places among a plurality of the phase change materials for the heat energy use place grouped into the group of the same usage time.

8. The method for waste heat storage and recovery according to claim 7, further including the steps of:

calculating a required calorie of each matched heat energy use place when two or more heat energy use places are matched in response to any phase change material;

comparing the calculated total calorie with a latent calorie of a corresponding phase change material;

additionally selecting a phase change material that is lower than the corresponding phase change material when it is determined that the total calorie is greater than the latent calorie; and supplying together with heat energy by a latent heat of the phase change material that is additionally selected.

* * * * *